United States Patent [19]
Burkhardt

[11] Patent Number: 5,296,746
[45] Date of Patent: Mar. 22, 1994

[54] EXTENDED RANGE CHARGING SYSTEM FOR ELECTRICAL VEHICLE

[76] Inventor: Harry E. Burkhardt, 106 Seminole Dr., Roanoke, Tex. 76262

[21] Appl. No.: 992,087

[22] Filed: Dec. 17, 1992

[51] Int. Cl.$^5$ ............ F03D 9/00; H02J 7/14; H02J 7/32
[52] U.S. Cl. ............ 290/55; 180/2.2; 290/44
[58] Field of Search ............ 290/44, 55; 180/2.2

[56] References Cited

U.S. PATENT DOCUMENTS 3,713,503  1/1973  Haan .................... 290/55
3,878,913  4/1975  Lionts et al. .......... 290/44
4,424,452  1/1984  Francis ................. 290/55

Primary Examiner—A. D. Pellinen
Assistant Examiner—Robert Lloyd Hoover
Attorney, Agent, or Firm—John E. Vandigriff

[57] ABSTRACT

The invention is to a wind charging system for an automobile which includes a wind driven turbine blade that is attached to a plurality of alternators by a gearing system. The gearing system includes a large gear driving a plurality of small gears, each attached to an alternator. The system is mounted in a single frame that mount in the engine compartment of a standard automobile.

18 Claims, 7 Drawing Sheets

EXTENDED RANGE CHARGING SYSTEM FOR ELECTRICAL VEHICLE

FIELD OF THE INVENTION

This invention relates to electrical powered vehicles, and more particularly to a charging system operable at low vehicle speeds to extend the range of the electrical powered vehicles.

BACKGROUND OF THE INVENTION

To extend the driving range of electric powered automobiles, charging systems have been devised to provide battery charging through wind driven generators as the vehicle is moving. Since speed of the vehicle is a direct factor in the amount of charge developed by the wind driven charging system, there is very little charging power being developed while a vehicle is accelerating from a stopped position, and while the vehicle is stopped at a traffic signal. Therefore, the amount of dependable charging power is very small.

Prior art air charge systems for automobiles usually require especially designed automobile bodies to accommodate the air charge system. Such system designs include special air channels to direct air to the rear of the vehicle to move fan blades which turn an electric generator or alternator. The speed of vehicles of this design is also a factor in the amount of charge being produced.

Most other charger system designs are of a size and configuration that is impractical for installing in existing engine compartments of present day automobiles.

SUMMARY OF THE INVENTION

The battery charging system of the present invention is a wind driven system utilizing a backward tilted "squirrel cage" type wind wheel. Attached to each end of a shaft about which the wind wheel turns are large gears. Each large gear rotates a plurality of small gears, each attached to a standard automobile alternator. The gear ratio between the large and small gears is such to maximize alternator speed during forward motion of the automobile in which the system is installed. The gearing system provides the capability to maximize the rotational speed of the standard alternators to provide optimum charging at low vehicle speeds. This extends the driving range of the vehicle.

A second embodiment utilizes an axial fan type blade attached to a shaft having a single large gear turning several smaller gears and alternators. The second embodiment utilizes a part of the first embodiment, including a drive shaft and one of the set of large gear and plurality of small gears and alternators.

A unique gear configuration is used to provide sufficient rotation speed of the multiple alternators as defined by alternator manufacturers to provide a minimum of RPM's required to generate an electrical charge to maintain battery charge.

The use of gears provide the capability to achieve the maximum rotation speed at low automobile speeds to generate the electrical output necessary to maintain maximum charging of the batteries of the automobile. The output of the alternators, through the use of the gear arrangement, provides the charging power to extend the travel distance of the vehicle.

Two embodiments are illustrated to provide a versatile design. A cluster of four geared alternators is used in one embodiment along with an axial style blade. This embodiment may be used in smaller automobiles. A second design uses two clusters of four along with a wind turbine to provide a greater power output necessary in larger automobiles.

The technical advance represented by the invention, as well as the objects thereof, will become apparent from the following description of a preferred embodiment of the invention when considered in conjunction with the accompanying drawings, and the novel features set forth in the appended claims.

DESCRIPTION OF PREFERRED EMBODIMENT

Figure 1:
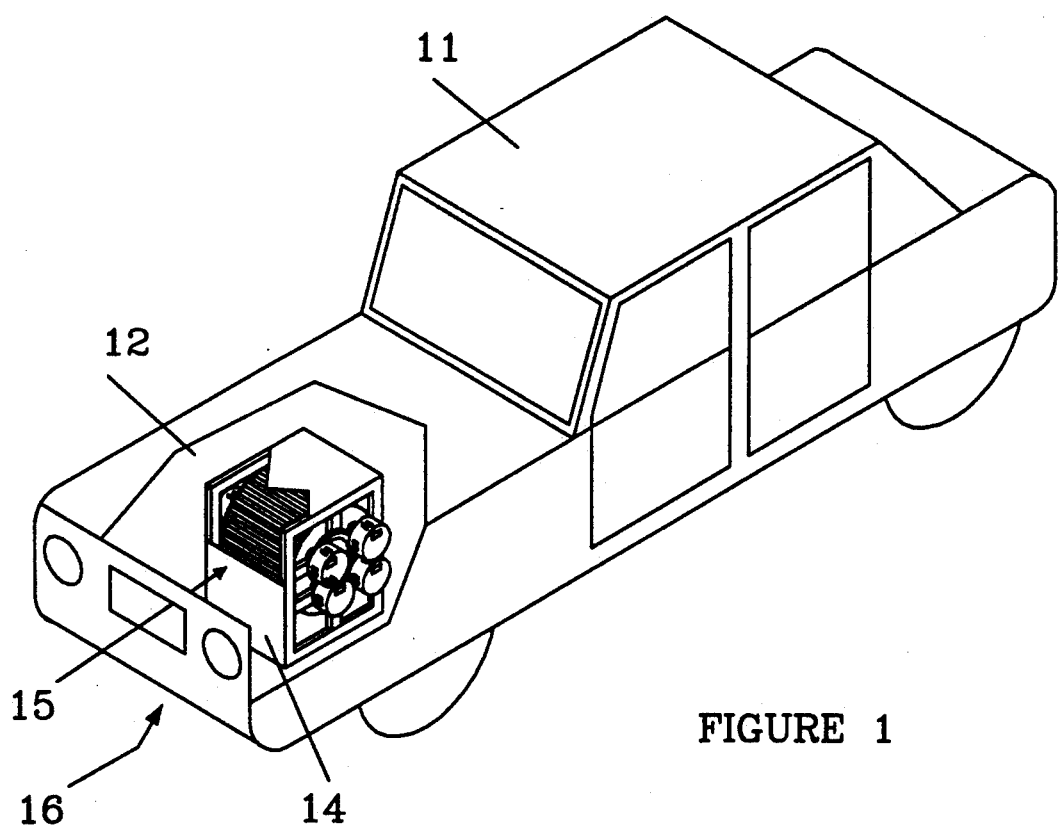
FIG. 1 illustrates an automobile with a wind charging system of the present invention.

FIG. 1 illustrates an electric powered automobile with a wind charging system. Automobile 11 is a standard design automobile that has been converted to electric power with an electrical drive motor powered with several batteries. A wind charging system 14 is mounted in the engine compartment 12. As the automobile is driven air is channeled as indicated by arrow 15 or arrow 16, or both.

Figure 1A:
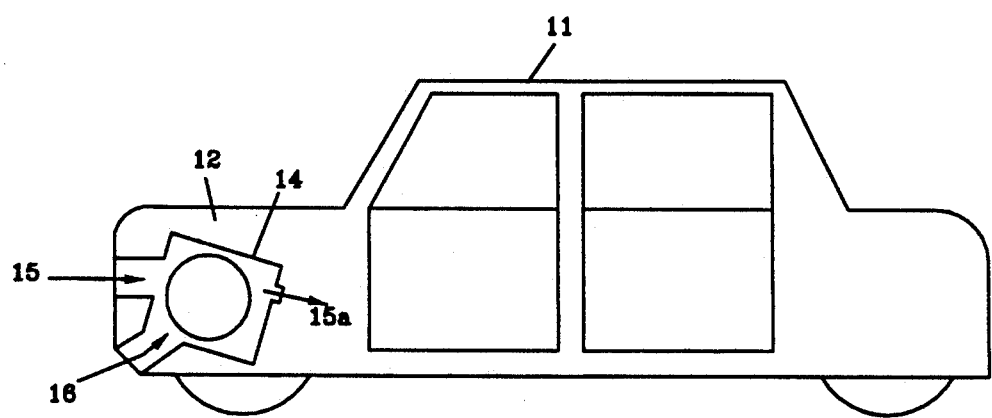
FIG. 1a is a side view of an automobile showing placement and air flow of the wind charging system.

FIG. 1a is a side view of automobile 11 showing relative placement of the wind charging system. Charging system 14 is mounted in the engine compartment where the gasoline engine would normally be mounted. An electric motor is connected to the drive shaft (not illustrated) and powered by batteries mounted in the trunk region of the automobile. Arrows 15 and 16 show two possible air paths for powering the wind charging system. The charging system may be tilted back to provide direct air flow into the turbine rotor.

Figure 2:
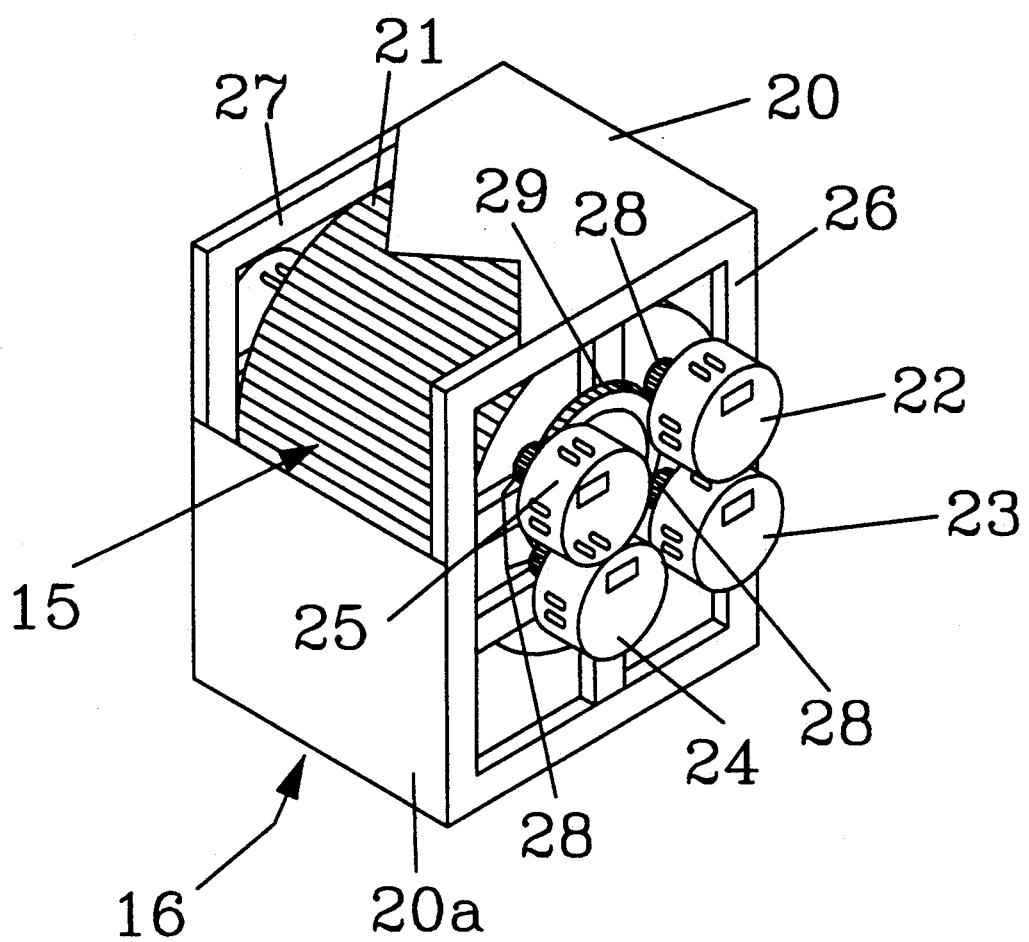
FIG. 2 illustrates one embodiment of the wind charging system.

FIG. 2 shows one embodiment of wind charging 14. The charging system has a frame 26 that encloses wind turbine rotor 21. Frame 26 has a top cover 20 shown cut-away to show the turbine rotor. A front panel cover 20a covers the lower half of frame 26. Air enters the opening indicated at 15 during forward motion of the automobile to turn the turbine rotor. As illustrated, arrow 15 points to a rectangular opening, however an enclosed channel open at the grill of the automobile can be used to funnel air into the rotor. Air flow can be funneled through an air scoop into the front bottom of frame 26 (arrow 16) to supply air from the bottom of the charging system. Either or both air paths be used. Air is exhausted indicated at 152 out the backside of charging system 14 through an exhaust vent.

Rotor 21 is mounted on a shaft 35 (FIG. 3) and turns two large gears 29, also mounted on shaft 35. Only one gear 29 is illustrated in FIG. 2, the other gear 29 is on the left side of charging system 14 as viewed in FIG. 3. Engaging large gears 29 are eight smaller gears 28, four on each side of charging system 14. Each small gear drives an alternator. Only alternators 22-25 are illustrated in FIG. 2. The gear ratio from large gear 29 to small gears 28 is such to maximize the rotation speed of each alternator to yield maximum power output from the alternators for slow forward motion of an automobile at slow, or start-up speeds. Gear ratios of from 8 to 1 to 10 to 1 have been found to provide adequate alternator charging speeds at low vehicle speeds. While gears have been described, pull-belt arrangement may be used to achieve similar ratios between large and small pulleys.

Figure 3:
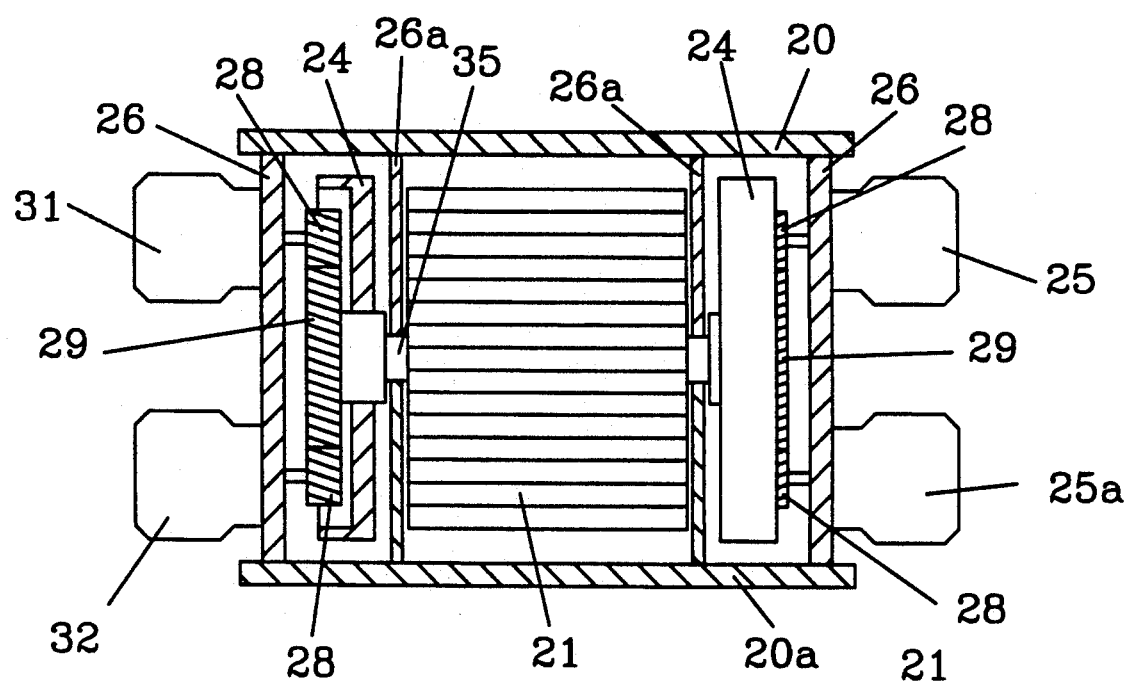
FIG. 3 is a front view of the charging system.

FIG. 3 is a front view of charging system 14, partially in section. Frame 26 on each side of the charging system is covered with top 20 and mounted on a base 20a. Rotor 21 is mounted on shaft 35 supported in vertical walls 26a on each side of rotor 21. Also mounted on shaft 35 are the two large gears 29. Two fly wheels 24 are mounted adjacent to and may partially cover large gear 29 and small gears 28, engaging large gears 29. Fly wheels 24, as with any flywheel, smooths out rotation of rotor 21, and provides momentum to maintain rotation.

A magnetic field within the flywheel can be used in conjunction with a magneto to provide electrical current to activate a tachometer 150, providing a visual indication to the driver with the RPM performance of the wind charging system.

Each small gear 28 is connected to an alternator, for example alternators 25a, 25, 31 and 32, illustrated in FIG. 3. Each side of charging system, 14 has four alternators, providing a total of eight alternators connected in parallel to provide maximum charging power at slow automobile speeds as a result of the gear ratio between large gears 29 and small gears 28.

Figure 4:
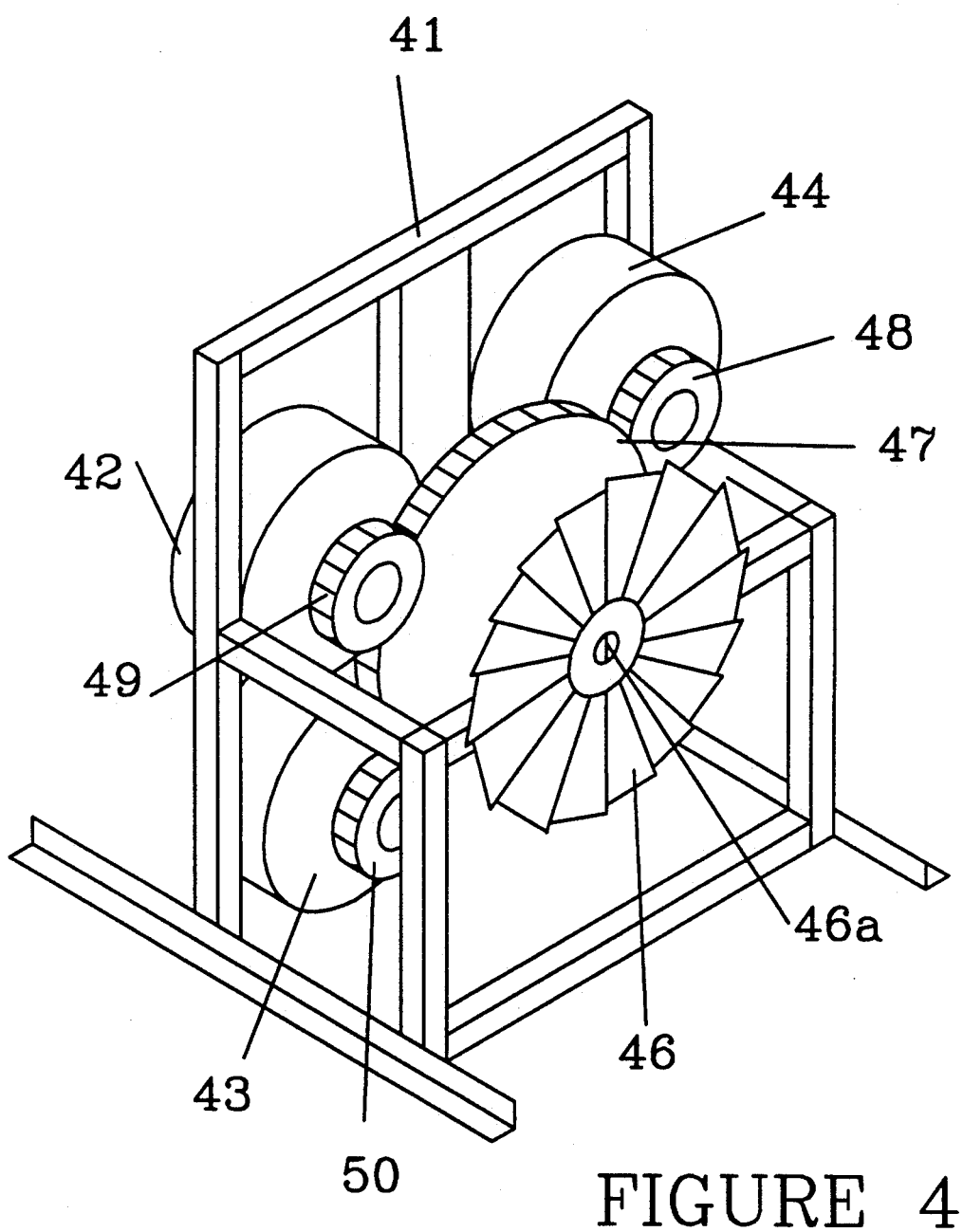
FIG. 4 is another embodiment of the wind charging system.

FIG. 4 illustrates a second embodiment of the invention. FIG. 4 shows a charging system that is essentially one half of the charging system of FIG. 3. Four alternators 42-45 are mounted on an open frame 41. Fan blade 46 is mounted on a shaft 46a that drives large gear 47. Large gear 47 engages four smaller gears 48, 49 and 50 (and one small gear not illustrated), which turns alternators 42-45. Frame 41 can be an open frame in this embodiment since air turns fan blade 46, and only one vertical frame is required, whereas, rotor 21, FIGS. 2 and 3, requires two vertical walls to support its rotor shaft, and air to turn rotor 21 has to be more directional than the air required to rotate fan blade 46. Since the charging current output of the embodiment in FIG. 4 is half that of the charging system of FIGS. 2 and 3, and the physical size is smaller, charging system 41 is more adaptable to smaller automobiles. However, two charging systems of FIG. 4 may be used side-by-side in a single vehicle to provide additional charging power.

While not illustrated in FIG. 4, a flywheel may be used in conjunction with the large gear to provide momentum to the rotation of gear 47, and the entire rotary system.

An axial style blade 46 is used with the blades pitched as on a windmill, or the fan on a jet engine.

Figure 5:
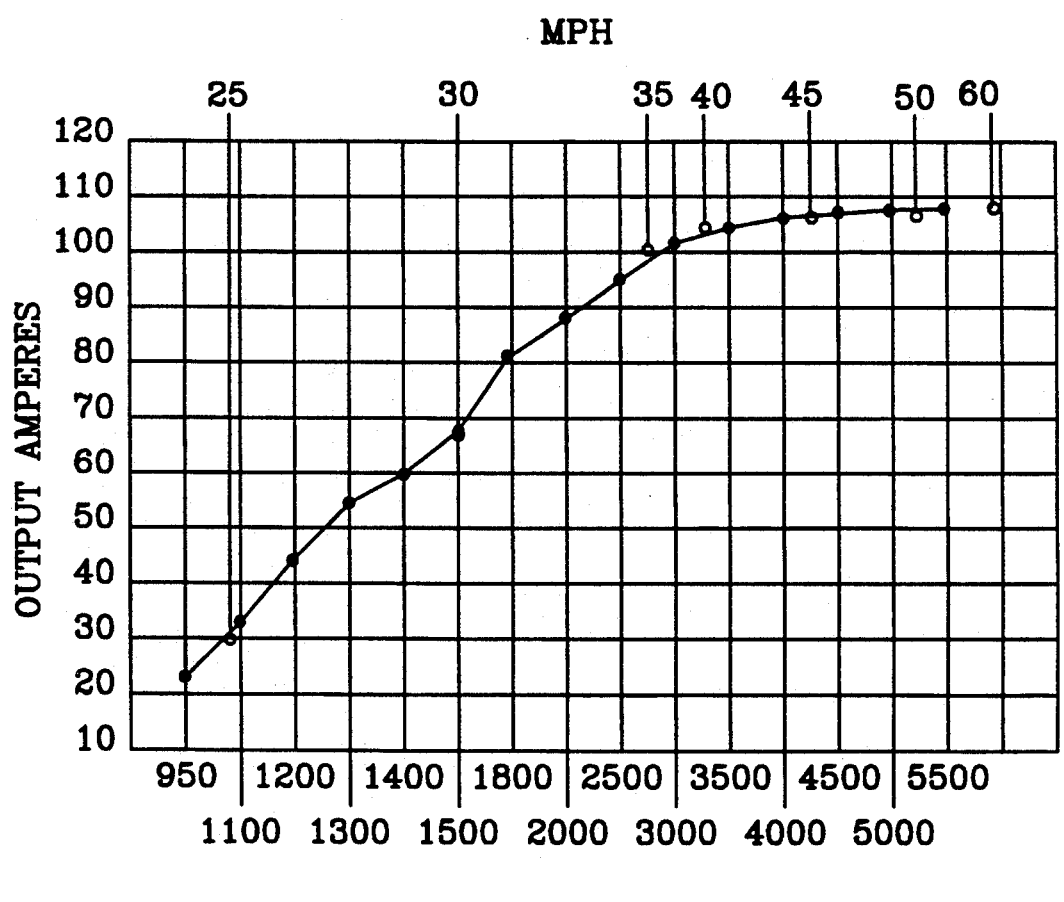
FIG. 5 illustrates output amperes of a standard alternator as a result of automobile speed, and RPM of the charging system rotor.

FIG. 5 shows output current of a single standard automobile alternator vs alternator rotor RPM, and vs automobile speed. For example, at an automobile speed for 25 MPH, a single alternator outputs a charging current of about 30 amperes, resulting in an output of up to 240 ampere from eight alternators, and an output of 120 amperes from four alternators.

Figure 6:
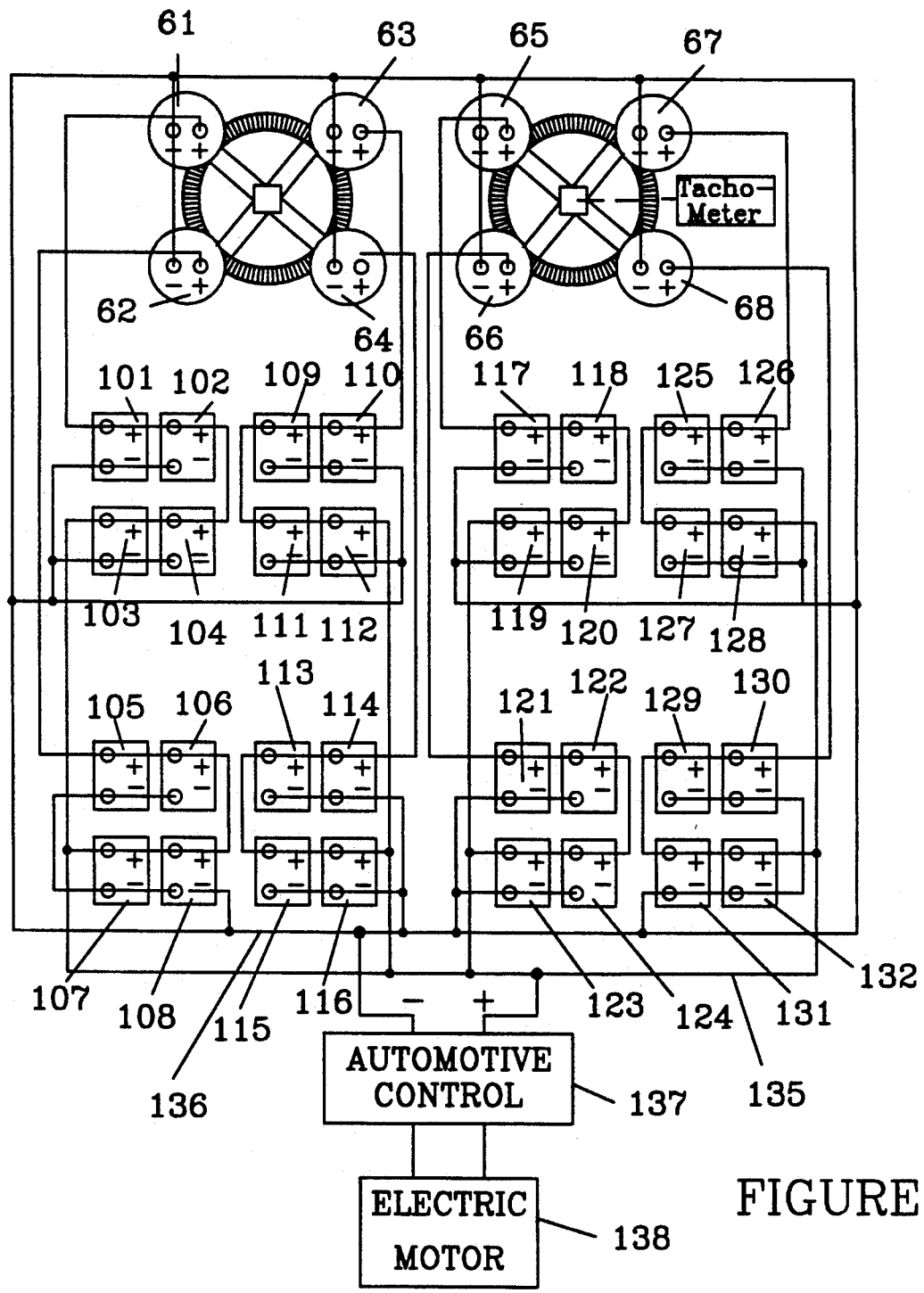
FIG. 6 illustrates one embodiment of a charging system utilizing multiple alternators.

FIG. 6 shows the charging system of the present invention with eight alternators, each alternator charging four batteries. Alternator 61 charges batteries 101-104, alternator 62 charges batteries 105-108, alternator 63 charges batteries 109-112, alternator 64 charges batteries 113-116, alternator 65 charges batteries 117-120, alternator 66 charges batteries 121-124, alternator 67 charges batteries 125-128, and alternators 68 charges batteries 129-132. While 32 batteries have been illustrated, fewer batteries may be used depending upon the vehicle requirements.

The positive terminal of each battery is connected to common line 135 and each negative battery terminal is connected to common line 136. The two battery lines are connected to the automotive control 137 which applies voltage and current to drive motor 138. The wind driven alternators help maintain a charge on the batteries, during movement of the automobile, and because of the number of alternators, and the gearing for the drive from the wind turbine to the alternators, the battery charge of each battery is maintained over a longer period of time than in a standard electrical charge system in an electrical automobile.

The invention is not limited to land vehicles, but can be used with any vehicle, such as a boat, that provides a wind force and utilizes batteries to provide and store electrical energy.

What is claimed is:

1. A wind charging system mounted in a standard automobile in the engine compartment for charging a plurality of batteries of an electrical powered vehicle, comprising:
   a single mounting frame;
   a wind driven rotation device mounted on a shaft in said frame;
   a plurality of automotive alternators mounted on said frame;
   a first gear attached to the shaft on a first side of said wind driven rotation device;
   a second gear attached to the shaft on a second side of said wind driven rotation device;
   a first plurality of small gears, one each attached to an alternator and in mesh with said first gear; and
   a second plurality of small gears, one each attached to an alternator and in mesh with said second gear;
   whereby said wind rotation device turns said alternators through said first and second gears and said small gears to supply charging power to said plurality of batteries.

2. The charging system according to claim 1, wherein said wind driven device is a wind turbine.

3. The charging system according to claim 1, wherein said wind driven rotation device is mounted on said shaft between two sides of said mounting frame, and a plurality of said alternators are mounted on each of said two sides of said mounting frame.

4. The charging system according to claim 1, wherein said first and second gears and said plurality of small gears have a ratio of rotation, one to the other, such that the alternators are turned at a fast speed during slow speed of said wind driven rotation device.

5. The charging system according to claim 1, wherein said charging system is mounted in a standard automobile tilted at an angle to the horizontal plane to permit air flow directly against the wind driven rotation device.

6. The charging system according to claim 1, wherein said first and second gears each turns four smaller gears attached to four alternators.

7. The charging system according to claim 1, wherein said wind driven device is a single shaft windmill type blade, attached to a large gear directly driving four alternators through four small gears.

8. A wind charging system mounted in a standard automobile in the engine compartment for charging a plurality of batteries of an electrical powered vehicle at slow speeds, extending the driving range of the electrical powered vehicle, comprising:
- a single mounting frame;
- a wind turbine rotatably mounted on a shaft in said single frame;
- a plurality of automotive alternators mounted on said single frame;
- a first gear attached to said shaft on a first side of and rotated by said wind turbine;
- a second gear attached to said shaft on a second side of and rotated by said wind turbine;
- a first plurality of small gears, one each attached to an alternator and in mesh with said first gear; and
- a second plurality of small gears, one each attached to an alternator in mesh with said second fear;
- whereby said wind turbine turns said alternators through said first and second gears and said small gears to supply charging power to said plurality of batteries.

9. The charging system according to claim 8, wherein said wind turbine is mounted between two side frames, and a plurality of said alternators are mounted on each of said two frames.

10. The charging system according to claim 8, wherein said first and second gears and said plurality of small gears have a ratio of rotation, one to the other, such that the alternators are turned at a fast speed during slow speed of said turbine.

11. The charging system according to claim 8, wherein said charging system is mounted in a standard automobile, tilted at an angle to the horizontal plane to permit airflow directly against the wind driven rotation device, and through an air scoop at the bottom of the charging system.

12. The charging system according to claim 8, wherein said first and second gears each turns four smaller gears attached to four alternators.

13. The charging system according to claim 8, wherein said wind turbine is a single shaft windmill type blade, attached to a flywheel and a large gear driving four alternators.

14. The charging system according to claim 13, including a magneto used in conjunction with said flywheel to provide electrical current to a tachometer for providing a visual indication of the RPM performance of the wind charging system.

15. The charging system according to claim 8, including a flywheel mounted adjacent and extending over each of said large gears to provide rotational momentum.

16. A wind charging system mounted in a standard automobile in the engine compartment for charging a plurality of batteries of an electrical powered vehicle at slow speeds, extending the driving range of the electrical powered vehicle, comprising:
- a single mounting frame;
- a wind driven multi-lobe blade mounted on a single shaft forward of said single frame;
- a plurality of automotive alternators mounted on said single frame behind said blade;
- a first gear attached to said single shaft; and
- a plurality o small gears, one each attached to an alternator and in mesh with said first gear;
- whereby said wind driven blade turns said alternators through said first gear and said small gears to supply charging power to said plurality of batteries.

17. The wind system according to claim 16, wherein said plurality of automobile alternators may range from two to ten alternators per charging system.

18. The charging system according to claim 16, wherein said wind driven blade is of a design of a windmill blade.

* * * * *